Sept. 25, 1951     H. M. PILLARS     2,569,331
DEMOUNTABLE PITTING HEAD FOR PEACH PITTING MACHINES
Filed June 30, 1947     2 Sheets-Sheet 2
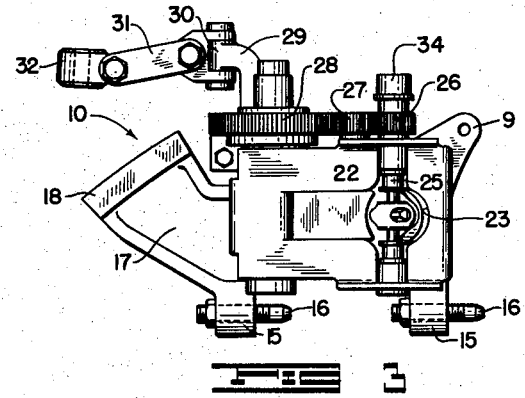
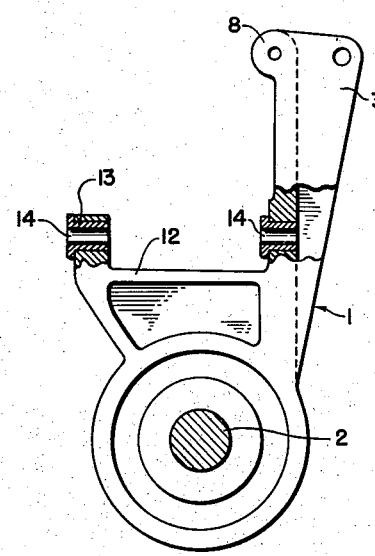
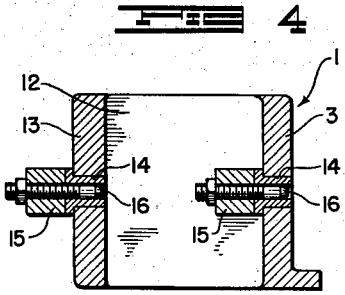
*INVENTOR.*
HARRY W. PILLARS
BY
*ATTORNEYS*

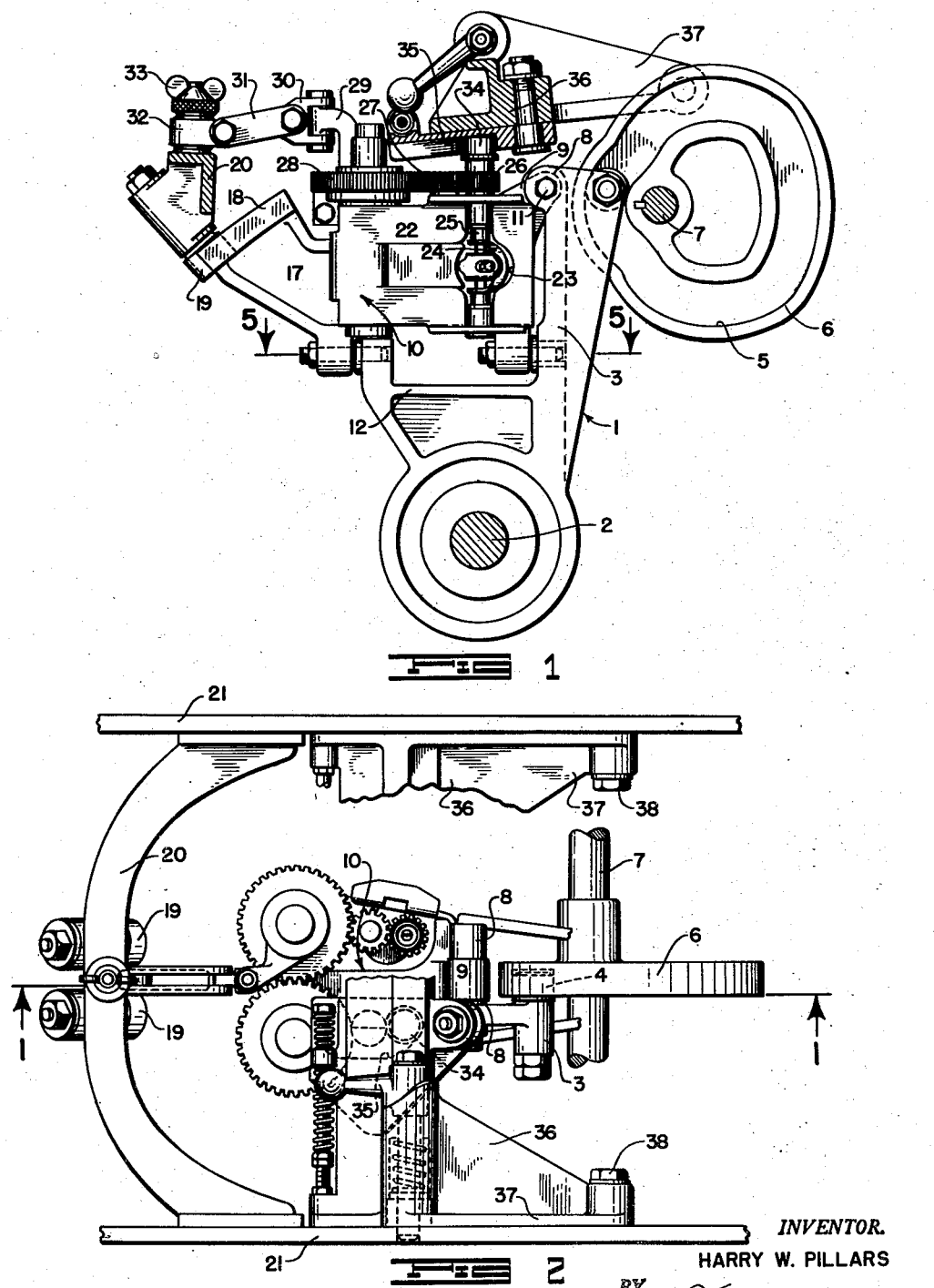

Patented Sept. 25, 1951

2,569,331

UNITED STATES PATENT OFFICE 2,569,331

DEMOUNTABLE PITTING HEAD FOR PEACH PITTING MACHINES

Harry M. Pillars, San Jose, Calif., assignor to Pacific Machinery Company, San Francisco, Calif., a corporation of California Application June 30, 1947, Serial No. 758,159

5 Claims. (Cl. 146—28)

1

This invention relates to peach pitting heads, more particularly to peach pitting heads for use in the continuous operating type of peach pitting machine as distinguished from the intermittently operated type.

An object of this invention is to provide a peach pitting head which is intended for use in the continuous peach pitter disclosed in Patent No. 2,376,526 issued May 22, 1945 to Albert R. Thompson and, further, is directed to certain features disclosed but not claimed in the copending application of William de Back and Frederick H. Luhdorff for Peach Pitting Head, Serial No. 698,998, filed September 24, 1946.

A further object is to provide a peach pitting head which is interchangeable; that is, a peach pitting head which may be readily and quickly removed from the machine and another head substituted thereby to minimize interruptions in the peach pitting operation and associated packing processes. In this connection, it should be observed that the peach pitting head is a vital link in the canning or packing process and that, inherently, a mechanism of this nature operating at high speed and continuously during the canning season may get out of adjustment. Heretofore, replacement or readjustment of a damaged peach pitting head has necessitated complete shut-down of an entire processing line for several hours or even days. The present interchangeable peach pitting head reduces such time loss to a mere few minutes.

A further object is to provide an interchangeable mounting for peach pitting heads which insures proper alignment of the peach pitting head with other parts of the machine.

With the above and other objects in view as may appear hereinafter, reference is directed to the accompanying drawings in which:

Figure 1 is a side elevational view of the interchangeable peach pitting head shown in position in a peach pitting machine, the peach pitting machine being shown in section and fragmentarily substantially along the line 1—1 of Figure 2.

Figure 2 is a top or plan view of the peach pitting head with a portion of the bridge which supports one of the pitting knife control cams being broken away to facilitate the illustration.

Figure 3 is a side elevational view of the peach pitting head removed from the machine.

Figure 4 is a side elevational view, with portions shown in section, of the cradle arm which carries the peach pitting head.

Figure 5 is a sectional view through 5—5 of Figure 1.

As stated hereinbefore, the peach pitting head is particularly designed for incorporation in the peach pitting machine shown in the Thompson Patent No. 2,376,526, and therefore utilizes the means shown in said patent employed to feed the peaches into and through suitable slicing and sawing devices. The sliced and sawed peach halves are fed progressively past the peach pitting head in much the same manner as in the above-mentioned patent. The peach pitting head is mounted in a cradle 1 which is secured to a shaft 2 forming a part of the peach pitting machine. The cradle 1 includes an upwardly directed arm 3, the upper forward extremity of which is provided with a horizontally disposed cam follower roller 4. The roller 4 coacts with a cam way 5 provided in a cam 6 mounted on a shaft 7 of said peach pitting machine. As disclosed more fully in the above-mentioned patent, the cam 6 is employed to oscillate the cradle 1 so that the peach pitting mechanism may be caused to move in unison with the halved peaches as they travel rearwardly from the peach halving mechanism.

Rearwardly of the roller 4, the arm 3 is divided longitudinally to form a pair of bosses 8 between which extends an ear 9 projecting from a peach pitting head structure 10. A bolt 11 secures the ear 9 between the bosses 8.

The cradle 1 is provided with a forwardly directed portion 12 in alignment with and joined to the base end of the arm 3. This portion terminates in an upturned boss 13. The boss 13 and the arm 3 receive aligned bushings 14. The pitting head frame structure is provided with depending bosses 15 in which are mounted forwardly directed pins 16 adapted to enter the bushings 14. The boss 13 of the cradle 1 is located rearwardly from the forward boss 15 of the peach pitting head structure a distance sufficient to enable the head structure to be moved rearwardly until the pins 16 are withdrawn from the bushings 14.

Extending rearwardly and upwardly from the pitting head structure 10 is a track arm 17 which terminates in an arcuate track 18 having its center of curvature coinciding with the center of the shaft 2. The track 18 is engaged on opposite sides by rollers 19 supported by a frame 20 which in turn is rigidly attached to the side plates 21 of the peach pitting machine, as shown in Figure 2.

The peach pitting head structure per se is more fully disclosed in the hereinbefore mentioned application of William de Back and Frederick Luhdorff, Serial No. 698,998, filed September 24, 1946. Said peach pitting head structure 10 includes a pair of fruit contact plates 22 covering its vertical sides. The plates 22 have openings 23 through which rotate peach pitting knives 24. The pitting knives are mounted on vertical shafts 25 which protrude through the top of the head 10 and are provided with pinion gears 26 which mesh with connecting gears 27. These are, in turn, oscillated by drive gears 28. The pair of drive gears 28 mesh with each other so that the pair of knives are oscillated simultaneously. One of the drive gears 28 is equipped with a drive lever 29 which is connected by a universal joint 30 and links 31 to an anchor collar 32 removably secured on the cross frame 20 above the rollers 19. That is, the frame 20 is provided with an upwardly directed pin which receives the collar 32 and which is provided with a wing nut 33.

As brought out more fully in the aforementioned co-pending application, the pitting knives not only oscillate but swing laterally outwardly from each other. This lateral movement is accomplished by means of rollers 34 located at the upper extremities of the shafts 25 and arranged to engage cam members 35 supported under a cam bridge 36. The cam bridge is provided with forwardly directed arms 37 which are pivotally secured as indicated by 38 to the side plates 21 of the peach pitting machine.

During operation of the peach pitting machine, the pitting head is securely held by the cradle 1. Not only is lateral movement prevented, by the manner in which the pins 16 fit the bushings 14 and the ear 9 is held between the bosses 8, but also by the arrangement of the track 18 and its guide rollers 19.

When it is necessary to interchange the peach pitting head structure, it is merely necessary to swing the cam bridge 36 upwardly clear of the peach pitting head, loosen the wing nut 33 to remove the anchor collar 32, then remove the bolt 11 so that the ear 9 may be withdrawn from between the bosses 8, while simultaneously withdrawing the pins 16 from the bushings 14. This may be accomplished virtually in a matter of seconds. The installation of a new peach pitting head is equally rapid. Thus it will be seen that delays in the packing operations occasioned by mal-functioning of the peach pitting head may be reduced to a minimum.

Many other embodiments of the invention may be resorted to without departing from the spirit of the invention.

I claim:

1. In a fruit pitting machine, the combination of: a fruit pitting head including side plates adapted to be contacted by the halved surfaces of fruit and rotatable pitting knives adapted to make a circular cut about the halved pits of said fruit; an oscillatable cradle including a radial arm and a tangentially extending bracket near the base end of said arm; means for removably securing said pitting head to said cradle for movement in unison with halved fruit progressed past said side plates, said means including centering pins extending from the underside of said pitting head into said bracket and arm and bolt means securing said upper portion of head structure to said extended portion of said arm.

2. In fruit pitting machines wherein fruit is halved and moved continuously past the sides of a pitting head and the head is caused to oscillate for periodic movement in unison with the halved fruit to effect a pitting operation, the combination of: a unitary pitting head including contact plates for the halved fruits and knives movable through openings in said plates to sever the pits from the halved fruit; an oscillatable cradle for said pitting head defining a notch having radial and tangential sides; pin and socket means incorporating said pitting head and the tangential margin of said notch, said means being alined in the plane of movement of said cradle for fixing the underside of said pitting head to said cradle, and transversely extending means joining the forward side of said pitting head to said cradle at the radial extremity of said notch.

3. In fruit pitting machines wherein fruit is halved and moved continuously in two paths past opposite sides of a pitting head and the head is caused to oscillate for periodic movement in unison with the halved fruit to effect a pitting operation, the combination of: a pitting head disposed between the paths of said fruit halves and including a pair of laterally movable and oscillatable pitting knives, and contact plates for the fruit halves engaged by said knives; an oscillating mounting cradle for said pitting head disposed between the paths of said fruit halves; means for removably connecting said pitting head to said cradle; and readily separable guideway and roller means between said paths of fruit halves for restraining said pitting head against movement lateral to the plane of oscillation of said pitting head and cradle.

4. In fruit pitting machines wherein fruit is halved and moved continuously in two paths past opposite sides of a pitting head and the head is caused to oscillate for periodic movement in unison with the halved fruit to effect a pitting operation, the combination of: a pitting head between said paths including laterally movable and oscillatable pitting knives, and contact plates for the fruit halves engaged by said knives; an oscillating mounting cradle between said paths for said pitting head; means for removably connecting said pitting head to said cradle; readily separable guideway and roller means between said paths for restraining said pitting head against movement lateral to the plane of oscillation of said pitting head and cradle; and a drive means for said knives including readily releasable fixed anchor and gear means operable by oscillating movement of said pitting head relative to said fixed anchor to operate said knives.

5. In fruit pitting machines wherein fruit is halved and moved continuously past the sides of a pitting head and the head is caused to oscillate for periodic movement in unison with the halved fruit to effect a pitting operation, the combination of: a pitting head including laterally movable and oscillatable pitting knives, and contact plates for the fruit halves engaged by said knives; an oscillating mounting cradle for said pitting head; means for removably connecting said pitting head to said cradle; guideway and roller means for restraining said pitting head against movement lateral to the plane of oscillation of said pitting head and cradle; a drive means for said knives including releasable fixed anchor and gear means operable by oscillating movement of said pitting head relative to said fixed anchor to operate said knives; and a control means for effecting lateral movement of said knives including cam rollers associated with said knives, a bridge overlying said pitting head and cam means removably engageable with said cam rollers.

HARRY M. PILLARS.

REFERENCES CITED

The following references are of record in the file of this patent:

UNITED STATES PATENTS

| Number | Name | Date |
|---|---|---|
| 1,726,685 | Tettemham et al. | Sept. 3, 1929 |
| 2,376,526 | Thompson | May 22, 1945 |
| 2,380,530 | Jepson | July 31, 1945 |

FOREIGN PATENTS

| Number | Country | Date |
|---|---|---|
| 20,933/29 | Australia | May 13, 1929 |
| 6169/32 | Australia | Feb. 17, 1932 |